US008728208B2

(12) United States Patent
Langford et al.

(10) Patent No.: US 8,728,208 B2
(45) Date of Patent: May 20, 2014

(54) AIR CLEANER

(75) Inventors: Jocelin Langford, Brigg (GB); Ellen Piercy, Hull (GB); Steve Walsh, Hull (GB)

(73) Assignee: Reckitt & Colman (Overseas) Limited, Slough, Berkshire (GB)

( * ) Notice: Subject to any disclaimer, the term of this patent is extended or adjusted under 35 U.S.C. 154(b) by 547 days.

(21) Appl. No.: 12/921,258

(22) PCT Filed: Mar. 6, 2009

(86) PCT No.: PCT/GB2009/000617
§ 371 (c)(1),
(2), (4) Date: Nov. 2, 2010

(87) PCT Pub. No.: WO2009/109763
PCT Pub. Date: Sep. 11, 2009

(65) Prior Publication Data

US 2011/0048232 A1 Mar. 3, 2011

(30) Foreign Application Priority Data

Mar. 7, 2008 (GB) .................................. 0804311.9

(51) Int. Cl.
*B01D 47/00* (2006.01)

(52) U.S. Cl.
USPC ................ 95/149; 96/270; 96/322; 261/34.1; 261/72.1; 261/89; 55/471

(58) Field of Classification Search
None
See application file for complete search history.

(56) References Cited

U.S. PATENT DOCUMENTS

| | | | | |
|---|---|---|---|---|
| 6,092,794 | A * | 7/2000 | Reens | 261/115 |
| 7,569,102 | B2 * | 8/2009 | Kim et al. | 96/281 |
| 7,591,885 | B2 * | 9/2009 | Kim | 96/284 |
| 2002/0139252 | A1 * | 10/2002 | Wong | 96/322 |
| 2003/0167740 | A1 * | 9/2003 | Murphy | 55/337 |
| 2005/0011354 | A1 | 1/2005 | Stead | |
| 2005/0072308 | A1 * | 4/2005 | Aoyagi | 96/235 |

(Continued)

FOREIGN PATENT DOCUMENTS

| | | | |
|---|---|---|---|
| DE | 20312576 | U1 | 12/2003 |
| EP | 0750931 | A | 1/1997 |

(Continued)

OTHER PUBLICATIONS

English Language Abstract for KR200424506.

(Continued)

*Primary Examiner* — Duane Smith
*Assistant Examiner* — Pankti Patel
(74) *Attorney, Agent, or Firm* — Norris McLaughlin & Marcus PA

(57) ABSTRACT

An air cleaner is described comprising a housing having an air inlet and an air exhaust extending therethrough, a refill for containing a reservoir of liquid which is releasable from the housing, a nebulizer within the housing configured, in use, to be in fluid contact with the source of liquid to generate a mist of liquid droplets, said nebulizer being configured, in use, to eject the mist upwardly, a chamber within the housing in which the mist is retained, a fan within the housing configured, in use, to generate a flow of air through the air inlet and into the chamber such that at least some of the contaminants in the air flow are urged by the mist out of the flow of air and toward the refill. A refill for the air cleaner is also described as well as the use of said air cleaner.

18 Claims, 2 Drawing Sheets

(56) References Cited

U.S. PATENT DOCUMENTS

Figure 1:
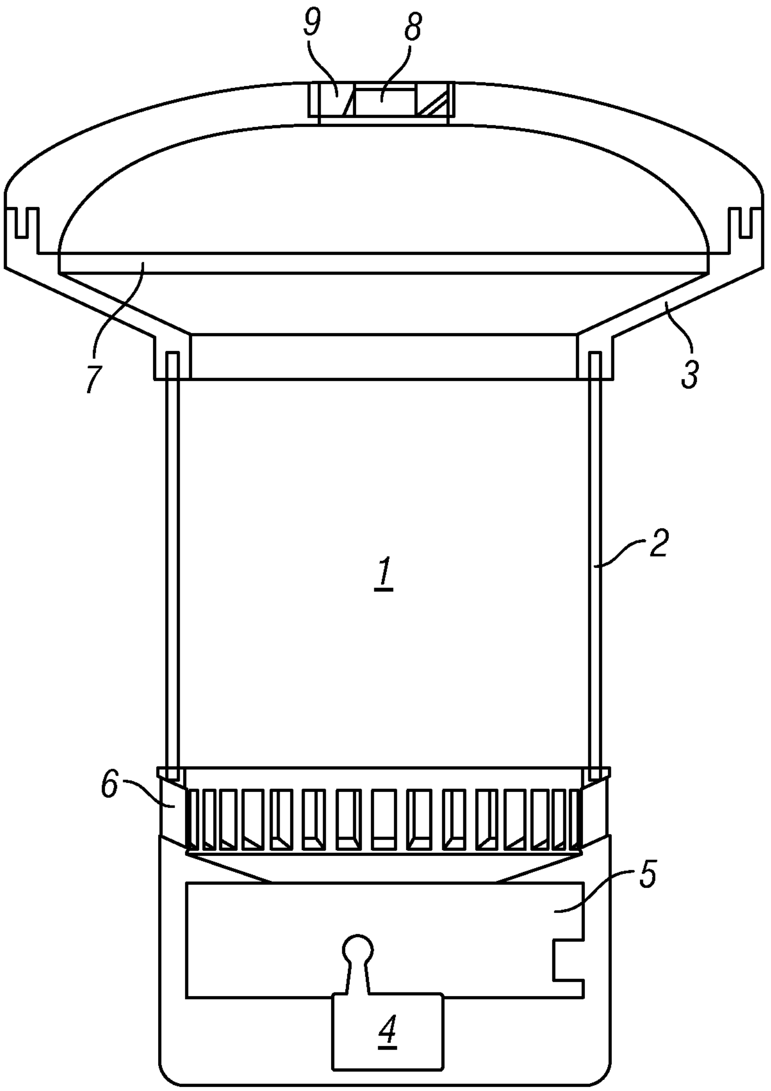

| | | | | |
|---|---|---|---|---|
| 2005/0126393 | A1 * | 6/2005 | Chen et al. | 95/224 |
| 2005/0263003 | A1 * | 12/2005 | Fornai et al. | 95/211 |
| 2006/0102000 | A1 * | 5/2006 | Kim et al. | 96/235 |
| 2006/0230713 | A1 * | 10/2006 | Kim | 55/283 |
| 2010/0011960 | A1 * | 1/2010 | Lawrence | 96/27 |

FOREIGN PATENT DOCUMENTS

| | | | |
|---|---|---|---|
| EP | 1832817 | A | 9/2007 |
| GB | 2156204 | A | 10/1985 |
| JP | 09225245 | A | 9/1997 |
| JP | 10216448 | A | 8/1998 |
| KR | 200424506 | A | 8/2006 |

OTHER PUBLICATIONS

English Language Abstract for JP10216448.
English Language Abstract for JP09225245.
English Language Abstract for DE20312576.

* cited by examiner

AIR CLEANER

This is an application filed under 35 USC 371 of PCT/GB2009/000617.

FIELD OF THE INVENTION

The present invention relates to an air cleaner. In particular, the air cleaner is designed as a low cost unit suitable for domestic and/or personal use which can reliably scrub contaminant particles from the air.

BACKGROUND

Air filters are known to use a fan to generate a flow of air through a solid filtration medium. Whilst such filters are successful, a relatively large fan is required to overcome the pressure drop across the filter, resulting in a device which is relatively noisy and consumes a relatively large quantity of energy.

A number of air cleaners are known which generate a mist of water to trap entrained particles in air. These include U.S. Pat. No. 7,115,155 with a rotating tube, the bottom end of which is positioned in a reservoir. The tube has a number of openings through which water is sprayed under centrifugal force as the tube is rotated. This generates a mist through which a stream of air is passed for cleaning.

U.S. Pat. No. 6,656,253 uses an ultrasonic atomiser to generate a mist. The mist of particles is charged to attract the entrained particles in a flow of air. The stream of charged particles and entrained contaminants is then passed through a collecting surface which traps the contaminants.

WO 02/077537 discloses a distributor to generate a spray of droplets which trap airborne contaminants. The dirty stream is then passed through a UV chamber and filter to remove the contaminants before the water is re-circulated.

The present invention aims to provide a simple low cost device with low energy consumption which is suitable for domestic use and which can readily be maintained by the user.

SUMMARY OF INVENTION

According to a first aspect of the present invention there is provided an air cleaner comprising:

a housing having an air inlet and an air exhaust extending therethrough;

a refill for containing a reservoir of liquid which is releasable from the housing;

a nebuliser within the housing configured, in use, to be in fluid contact with the source of liquid to generate a mist of liquid droplets;

said nebuliser being configured, in use, to eject the mist upwardly;

a chamber within the housing in which the mist is substantially retained;

a fan within the housing configured, in use, to generate a flow of air through the air inlet and into the chamber such that at least some of the contaminants present within the air flow are urged by the mist out of the flow of air toward the refill and/or a contaminant outlet.

According to a second aspect of the present invention there is provided a refill for an air cleaner according to the first aspect of the present invention wherein the refill comprises:

a housing;

a reservoir within the housing suitable for retaining a liquid therein;

at least two apertures through the housing wherein one aperture is a liquid outlet and another aperture is a liquid inlet.

Preferably the reservoir of the refill is provided with liquid therein.

Alternatively the reservoir of the refill is provided with a non-liquid chemical component therein which is miscible with water added to the reservoir by a user of the refill. The non-liquid component may be a dry powdered or granulated chemical component. The non-liquid component may be a gel, gelled or gel-like chemical component. The non-liquid component may be a gaseous chemical component, preferably having a density that is greater than air such that said gaseous component does not escape the reservoir when a user attempts to add water to the reservoir.

Alternatively or additionally the refill is provided with a fragrance reservoir suitable for retaining a liquid fragrance therein. In the dual reservoir (reservoir and fragrance reservoir) arrangement there may be a fluid connection between said reservoir to permit, in use, liquid retained in the fragrance reservoir to flow into the reservoir. Alternatively, where there is no fluid connection between the reservoirs, the fragrance reservoir may have at least one aperture to operate, in use, as a liquid outlet. A plurality of fragrance reservoirs may be provided in the refill which may be advantageous as each fragrance reservoir may retain a different liquid fragrance therein.

In use of the air cleaner of the present invention, the mist generated by the nebuliser preferably contacts and/or traps contaminants in the flow of air to urge them out of the flow of air and away from the air exhaust whilst the air being exhausted from the cleaner through the air exhaust contains a reduced quantity of contaminants. Preferably all of the mist generated is denied access through the air exhaust to increase the efficacy of the air cleaner.

The air cleaner of the present invention is preferably suitable for domestic and/or personal use.

Preferably the housing has a lower portion and an upper portion. The air cleaner is preferably arranged such that, in normal use, the lower portion of the housing is in contact with a surface on which the air cleaner is to be operated from. Preferably the air inlet is located in the lower portion of the housing and the air exhaust in the upper portion of the housing. The nebuliser may be located away from the upper portion of the housing and/or toward a lower section of the chamber. In the arrangement for normal use of the air cleaner, the nebuliser is arranged to eject the mist upwardly relative to the surface contacting the housing and into the chamber and/or be arranged to eject the mist directly against the gravitational force acting on the mist particles once ejected.

Fluid contact between the nebuliser and the source of liquid is understood within the context of the present invention to comprise any suitable means of feeding liquid to the nebuliser including, but not limited to, pumping liquid toward the nebuliser, using capillary action to feed liquid to the nebuliser, dripping liquid on to the nebuliser. Preferably the nebuliser is feed the liquid via capillary action and this is discussed further hereinafter.

Preferably the nebuliser of the present invention is a piezo-electric nebuliser. Where the nebuliser is a piezo-electric nebuliser this provides a simple low cost means for creating a mist of liquid droplets with a low energy consumption. Alternatively, the nebuliser could be provided by a suitably tuned nozzle through which a quantity of liquid is forced to create the mist, wherein the liquid may be held under pressure in an aerosol or the like.

Alternatively or additionally, the nebuliser could be provided by a venturi to eject liquid into the chamber to create the mist. In the venturi arrangement, the airflow may be directed to blow across the surface of the venturi to generate the mist. The venturi may take the form of a venturi tube or orifice plate.

Alternatively or additionally, the nebuliser may be configured to heat up in order to evaporate the liquid into the chamber in order to generate the mist which is carried by the airflow.

As a further alternative or additional arrangement, the nebuliser may be a liquid platform in combination with an impeller or spinning disc to mechanically break up the liquid into small or smaller particles wherein the airflow may be directed to blow across the platform to generate the mist.

The nebuliser may, alternatively, be provided in the form of an ultrasonic means in the absence of a piezo effect to break up liquid into small or smaller particles and wherein the airflow may be directed to blow across the platform to generate the mist.

The nebuliser may use an ink jet-type spraying mechanism such as an electrospray system. Preferably Plateau-Rayleigh instability fluid instability is exploited in the design of a particular type to facilitate the production of a steady stream of droplets.

The nebuliser may take the form of cyclonic airflow or vortex systems of airflow above a body of liquid in order to draw the liquid into the airflow to generate the mist.

The nebuliser may take the form of a liquid matrix through which a gas, preferably air, is forced in order to generate the mist.

Preferably the exhausted air contains at least 20% less contaminants than the air taken in by the air cleaner, and more preferably at least 40% less contaminants, and most preferably at least 60% less contaminants, and ideally at least 80% less contaminants. Preferably substantially all of the contaminants in the air flow are urged by the mist out of the flow of air and toward the reservoir of the refill.

Further, by urging at least some of the contaminants (i.e., those not trapped on the walls of the chamber or on other parts of the air cleaner) toward the refill, the need for a separate filter element to remove the contaminant may be eliminated. Where a filter element is not present, the device may be able to operate with a lower power consumption as there is no need to force the airflow through such a filter element. In this arrangement all that may be required to clean the device is a periodic replacement of the refill rather than the user also needing to change or clean a filter element.

Nevertheless, while there are some advantages for the air cleaner of the present invention to not include a filter element, such a filter element may be indeed be provided in the air cleaner of the present invention. Where a filter element is provided, the filter element may act as a secondary cleaning means such that any contaminants that are not urged by the mist away toward the refill during use may be trapped thereby. Examples of possible filter elements are: mechanical filter elements (melt-blown, nano fibre filter, glass fibre filter, reticulated foam, granular); electrostatically charged; PTFE or similar membrane-type surface loading filter; activated carbon or similar for additional removal of odours; and combinations thereof.

One advantage of having the nebuliser upwardly eject the mist is that as the mist droplets lose their energy, they fall under gravity back down towards the nebuliser and may be collected for re-use. With a generally upwardly directed nebuliser, the flow of air may be set up to be a downward counter-flow. However, preferably, the air flow is also upward as this helps to sustain a relatively large region of dispersed mist thereby enhancing its ability to scrub the air flow.

Preferably a wick transports the liquid to the nebuliser to permit the ejection of mist. The wick may be composed of a plurality of separate components, however, a dual wick system is generally preferred comprising a nebuliser wick and refill wick. This is advantageous as position of the nebuliser wick needs to be carefully maintained in order to permit the nebuliser to eject a mist, therefore, having a refill wick located in the reservoir is better likely to preserve the position of the nebuliser wick. In such a dual wick system, the refill wick will preferably protrude through the liquid outlet aperture of the refill to contact the nebuliser wick when the refill is engaged with the air cleaner.

This dual wick or plural wick system is additionally advantageous as any contaminants collected in the reservoir during the use of the air cleaner with one refill will be prevented from being present in the reservoir of a new refill as the refill wick is also replaced. The dual wick system may also serve to prolong the operational life of the nebuliser as the amount of contaminants coming into contact with the nebuliser and/or nebuliser wick will preferably be minimised.

A reservoir filter may be disposed within the reservoir to permit, in use, a mechanism to reduce, and preferably prevent, contaminants from coming into contact with the wick disposed within the reservoir.

Preferably the wick or at least one of the wicks are made of a material that is hydrophilic and contaminant-phobic, in other words, the wick(s) tend to resist the uptake of contaminants toward the nebuliser.

The simplest way to maintain the mist within the chamber is to provide a chamber of sufficient internal dimensions that the energy of the mist from the nebuliser and the flow of air is insufficient to allow a significant proportion of the liquid droplets to escape from the chamber.

In one embodiment at least a portion of the chamber may be arranged to diverge in the direction of airflow in order to slow the air flow to such an extent that the mist particles are not supported by the airflow well before they reach the end of the chamber. In practice, this creates a layer of mist at the level beyond which the mist cannot be sustained which produces a visually pleasing effect. Only a portion of the housing may be divergent. However, preferably, the chamber may be divergent along substantially its entire length. Effectively, this results in a chamber with a generally hollow frusto-conical shape.

Another manner in which the mist can be maintained within the chamber is to provide a porous hydrophobic membrane at the end of the chamber remote from the nebuliser. Such a membrane is very different from prior art filters which are designed to act as the primary filter medium to remove the impurities from the air. In the present arrangement, the separation of the particles from the air is done by the mist and the hydrophobic membrane is provided only to trap liquid particles which have traveled more than a predetermined distance from the nebuliser. As such, the membrane is significantly more porous (typical pore size 50-100 μm) than prior art filters so that the substantial pressure drop associated with the prior art is avoided. As the membrane is hydrophobic, liquid droplets tend to agglomerate on it. Once they reach a certain size, they gain sufficient mass to drop back down into the chamber, potentially for re-use within the nebuliser.

In a preferred embodiment of the present invention, the chamber has an inner chamber disposed therewithin. The inner chamber may have an air inlet port at an upper part thereof in order to allow the airflow from the chamber to enter the interior of the inner chamber. Extending at least partially into the interior space within the inner chamber and in registration with the air inlet port at the upper part of the inner chamber may be a sleeve. The sleeve is preferably hollow and of an annular configuration. Preferably the inner chamber is at least partially conical wherein the cone narrows toward the lower part thereof. The lower part of the cone may be open to define the mist contaminant outlet, preferably in registration with a fluid inlet for the reservoir. The hollow sleeve may define an air outlet therethrough in the upper part of the inner chamber, preferably this outlet is in registration with an air exhaust to expel the scrubbed air into the environment surrounding the cleaner.

The sleeve is preferably positioned within the inner chamber to deny the airflow a convenient route directly toward the air exhaust. The air inlet port of the inner chamber preferably directs the airflow at a suitable tangent to initiate a cyclonic flow of air following, at least partially, the boundary defined by the inner wall of the inner chamber. The resulting cyclonic airflow may be capable of acting as an inertial mass separator (IMS). In use, the IMS operates by the airflow spinning and/or spiraling through the inner chamber with a sufficient air speed to cause the mist and contaminants to be thrown out of the spinning/spiraling airflow toward the wall of the inner chamber. The inner chamber narrows causing increasingly smaller particles including contaminant particles not trapped or bound to the mist particles in the airflow to move towards the wall of said inner chamber. The clean air, or at least cleaner air, turns and exits the inner chamber through the centre of the sleeve and toward the air exhaust. The mist and contaminants which have been thrown out of the cyclonic airflow will preferably drain down the walls of the inner chamber toward the refill and into the liquid inlet of the refill.

In order for the airflow to become cyclonic, the airflow must be over a threshold speed which is dependant on the system, the system comprises the internal configuration of the chamber, the inner chamber, the sleeve, the air inlet of the inner chamber amongst other factors. The maximum airflow will also depend on the system but only to the extent that the system can support the airflow without tending to failure. Therefore, the airflow should preferably be tuned to be greater than the threshold speed for that particular system to create cyclonic airflow but less than the maximum for that particular system to conserve power consumption and prolong the mechanical life of the air cleaner.

The cyclonic airflow has a tendency to cause the air cleaner to emit a high pitched noise during operation, a whistling sound. In part this sound is an inherent feature of using cyclonic airflow however, the one piece construction of the inner chamber may cause the air cleaner as a whole to amplify the emitted high pitched noise. Therefore, the inner chamber may be suitably acoustically isolated from the other components of the air cleaner. Alternatively or additionally, the inner chamber may be made from at least two parts in order to reduce the emitted noise which is preferable for an air cleaner intended to be used as a personal and/or domestic air cleaner. Where the inner chamber is made from at least two parts, the refill may be provided with a lower part of the inner chamber.

Where the separate parts of the inner chamber are connected to each other a suitable dampening material may be present therebetween. Alternatively or additionally, such dampening material may be present where the inner chamber is connected to the other components of the air cleaner. Suitable dampening material is preferably a material that has sound dampening properties, yet is also substantially non-porous. One such suitable dampening material may be rubber.

Preferably a filter element is located between the air outlet and the air exhaust in order to catch any mist particles and/or contaminants that have not been thrown out of the cyclonic airflow. Alternatively, should there be no filter element, the air outlet and the air exhaust may be integrated or even be the same component.

In order to prevent loss of water through the air inlet, the air inlet is preferably a tortuous path and is preferably arranged to trap liquid droplets and return them to the nebuliser.

The cleaner and/or refill may be provided with a transparent window allowing visual access to the liquid being fed to the nebuliser. This provides a visual indication to the consumer of the cleanliness of the liquid and may serve as a useful end of life indicator for the quantity of liquid held within the reservoir.

The refill is preferably provided with engagement means which are configured to releasably engage with the housing of the air cleaner to secure the refill in a fixed position within said housing. The engagement means are preferably provided by one or more protrusions extending from the housing of the refill to engage with corresponding protrusions of the air cleaner housing. The engagement means may secure the refill in a fixed position by a snap-fit connection with the housing or a lock and key arrangement, or other suitable arrangement.

Alternatively or additionally, the air cleaner may be provided with securing means which are configured to contact a portion of the refill, preferably the lower part thereof, to releasably secure the refill in a fixed position after the refill is loaded into the cleaner.

The air cleaner preferably possesses a void therein to receive the refill and the refill is preferably sized to fill substantially all of the void. Preferably the void has an asymmetrical or non-regular shape and the refill has a corresponding shape such that the refill can only be loaded into the void in one way. Controlling the way the refill is loaded into the void may be advantageous as precise location of the refill's liquid inlet(s) and outlet(s) with the nebuliser and/or nebuliser wick and contaminant outlet can be assured despite any attempts by the user to erroneously load the refill.

In a preferred embodiment the air cleaner is provided with user-selectable controls. Such user-selectable controls may be operable to control the rate at which the air is scrubbed. The user-selectable controls may permit a user to vary the rate at which the air is scrubbed from a "low" to a "high" setting, optionally with one or more settings therebetween. When the user-selectable control is at the "low" setting, the fan may operate at a speed which is capable of pushing air through the air cleaner and/or creating cyclonic airflow but is of a slower speed than when the control is at the "high" setting. Somewhat similarly, when the user-selectable control is at the "low" setting, the nebuliser may eject a lower quantity of liquid in the mist than when the control is at the "high" setting.

The air cleaner may be provided with a user-selectable boost function, whereby should a user initiate the boost function, the air cleaner increases the rate at which it scrubs the air for a predetermined period of time before returning to the previous rate at which the air cleaner was scrubbing the air. Preferably, once initiated by a user, the boost function operates for a period of 30 minutes before returning to the previous rate, and more preferably for a period of 20 minutes, and most preferably for a period of 15 minutes.

The fan may be disposed within the air cleaner of the present invention may be arranged to draw an airflow therethrough by initially puling air into the air cleaner before pushing it through the majority of cleaner and out of the exhaust. This initial pulling and then pushing is preferred as any contaminants produced by the fan motor will be pushed into the airflow to be scrubbed. Alternatively the air cleaner may draw the air therethrough by pulling the air through the majority of the device before pushing it through the air exhaust and into the surrounding environment.

The air cleaner of the present invention may be provided with at least two fans. Where two fans are present one may be located adjacent the air inlet and the other fan located adjacent the air exhaust. In this dual fan arrangement, the airflow throughout the entirety of air cleaner may be more uniform and easier to regulate.

The liquid present in the refill may be an ionic liquid, preferably water. The liquid in the refill may further comprise additional components including, but not limited to, fragrances, pesticides, insecticides, bactericides, detergents, disinfectants odour neutralisers.

The flow of air may be arranged to swirl in the chamber. This causes the mist to swirl and enhances the contact between the air and water. This may be caused by a rotating vane or a series of angled vanes to direct the flow. However, preferably the air inlet is configured to direct airflow into the chamber at a suitable tangent to cause the air to swirl in the chamber.

The cleaner may be of the plug-in type, or may be battery powered. In the latter case, the batteries may be designed as part of the refill to be replaced. It may be advantageous for the batteries to be part of the refill as the battery life can be tuned to correspond with the operational life of the liquid in the refill. This arrangement may provide the device with a useful end-of-life indicator whereby at the end of the life of the refill, the battery power in the refill is no longer sufficient to power the air cleaner and once the user notices that the cleaner is no longer in operation the user will know to replace the refill.

According to a further aspect of the present invention, the use of an air cleaner to scrub the air in a personal and/or domestic space is provided, wherein the use comprises the steps of operating an air cleaner as described above until the air is scrubbed of at least some of the contaminants contained therein.

According to a further aspect of the present invention there is provided an air cleaner comprising:

a housing having an air inlet and an air exhaust extending therethrough;

a refill for containing a reservoir of liquid which is releasable from the housing; a nebuliser within the housing configured, in use, to be in fluid contact with the source of liquid to generate a mist of liquid droplets; a chamber within the housing in which the mist is substantially retained, and an inner chamber that is at least partially conical provided within said chamber; a fan within the housing configured, in use, to generate a flow of air through the air inlet and into the chamber such that at least some of the contaminants present within the air flow are urged by the mist out of the flow of air and toward the refill and/or a contaminant outlet; and wherein the air inlet port and the sleeve direct, in use, the airflow at a suitable tangent to initiate a cyclonic flow of air following, at least partially, the boundary defined by the inner wall of the inner chamber to produce an inertial mass separator.

Figure 2:
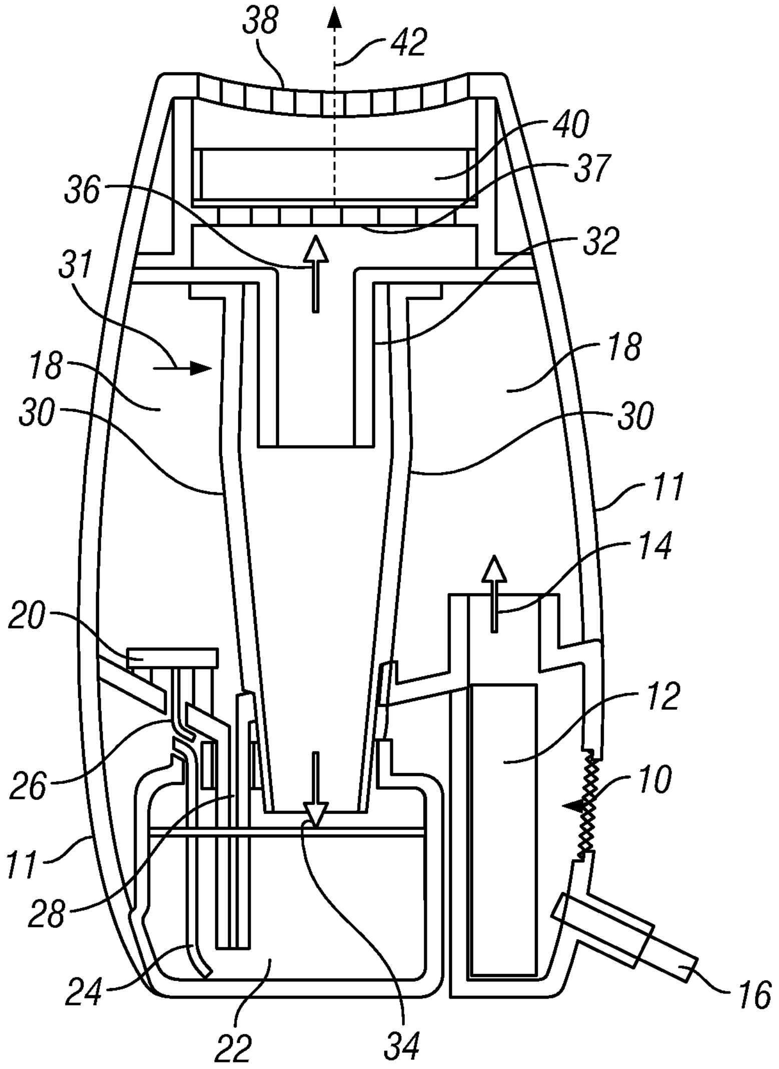

In order to allow the present invention to be more readily understood, embodiments of the invention will now be described, by way of example only, with reference to the following drawings in which:

FIG. 1 illustrates a sectioned side elevation of one embodiment of the present invention; and FIG. 2 illustrates a sectioned side elevation of a further embodiment of the present invention.

The air cleaner illustrated in FIG. 1 comprises a housing 1 with a generally cylindrical lower portion 2 and an outwardly tapering portion 3. The current preference is that, instead of this, the housing has a generally outwardly tapering conical portion.

Toward the bottom end of the housing is a nebuliser 4 which is well known in the art. The nebuliser 4 is in fluid communication with a reservoir 5 of liquid within a refill 13.

The housing 1 is provided with a void (not shown) and the refill 13 has a shape which corresponds with the shape of said void. The refill 13 has engagement means (not shown) to permit the refill 13 to be releasably fixed in the correct position within the housing 1.

An air inlet 6 comprises a number of passages arranged circumferentially around the housing and is provided directly above the reservoir 5. These have a tortuous configuration to prevent liquid droplets from leaving the chamber via these inlets.

A porous membrane 7 of hydrophobic material is provided at the upper end of the divergent portion 3 of the housing. A fan 8 is provided at the top of the housing at air outlet 9.

In use, the nebuliser 4 generates a mist in the chamber 1. The fan draws air in through the inlet 6. The air is scrubbed by the mist and the clean air passes through the hydrophobic membrane 7 and out of the housing through the outlet 9 around the fan 8. The nebuliser 4 and fan 8 are configured such that the water droplets of the mist generally have insufficient energy to reach the membrane 7. This effect is enhanced by the divergent portion 3 (or the generally conical nature of the entire housing) to slow the air speed away from the fan. Thus, the mist particles generally cannot travel beyond a certain distance and, instead, coalesce with neighbouring particles and fall back into the reservoir 5 where they are re-energised by the nebuliser.

Some particles will, of course, travel further than others and these more energetic particles impinge on the hydrophobic membrane 7. Here, they will coalesce with other liquid particles which have traveled this far and coalesce to the extent that they become too heavy to be maintained on the filter and fall back into the reservoir 5.

Over time, the water in the reservoir 5 will become dirty with all of the impurities which have been scrubbed from the air. A window (not shown) is preferably provided in the housing allowing the consumer to see the state of the water and make a judgement on when the reservoir liquid needs replacing.

Also, over time, despite the presence of the membrane 7 and the tortuous configuration of the air inlet 6, some liquid is inevitably lost from the system. The window to the reservoir also allows the consumer to determine if the level of liquid has dropped below an acceptable level, and again requires replenishment or replacement.

A number of variations of this embodiment are also contemplated, for instance, the air cleaner could be inverted with the nebuliser directing the mist downwardly and the flow of air being directed upwardly. Alternatively, the filter may be arranged horizontally with the same counter-current arrangement.

The air inlets may be arranged tangentially to cause the incoming air to swirl. These may be arranged to produce a cyclonic effect which enhances the scrubbing of the air and also provides a visually pleasing effect.

Instead of positioning the fan 8 at the top of the housing as shown to pull the air through the cleaner, there may be an outlet duct having a generally annular configuration surrounding the chamber 1 and the fan may be positioned at the bottom of this annular chamber to push the flow of air through the housing.

Turning to FIG. 2, the air cleaner of the further embodiment consists of a housing 11 having an air inlet 10 through which air may be drawn into the cleaner in order to be scrubbed. A fan 12 may be operable to draw the air through the inlet 10 and, via a tortuous path, force the air into the main chamber 18 of the cleaner.

At the base of the main chamber 18 is positioned a nebuliser 20. The nebuliser 20 is arranged to energise and eject a mist of liquid in a generally upward direction. This is achieved by the nebuliser 20 being in fluid contact with a reservoir 22 of a refill 23. The reservoir 22 is provided with an upwardly extending wick 24 which is capable of drawing liquid toward a nebuliser wick 26. The nebuliser wick 26 transports the liquid to the nebuliser 20 to permit the ejection of mist. The dual wick system is generally preferred as position of the nebuliser wick 26 needs to be carefully maintained in order to permit the nebuliser 20 to eject a mist, therefore, having a separate wick 24 forming a part of the refill 23 and being located in the reservoir 22 is better likely to preserve the position of the nebuliser wick 26. The refill 23 has two fluid entrances to permit ejected mist particles to eventually return to the reservoir and these will be described in more detail later.

Within the main chamber 18 is located an inner chamber 30. The inner chamber 30 has an air inlet port 31 at an upper part thereof to allow the airflow from the main chamber 18 to enter the interior of the inner chamber 30. A sleeve 32 extends partially into the interior of the inner chamber 30. The sleeve 32 is located in registration with the air inlet port 31. The sleeve 32 is hollow and of an annular configuration.

The inner chamber 30 is at least partially conical wherein the cone narrows toward the lower part thereof. The lower part of the cone may be open to define a contaminant outlet. The contaminant outlet permits, in use, mist particles to travel in the direction of arrow 34 toward the reservoir 22 which has a fluid entrance in registration therewith.

It may be desirable to ensure that a suitable pressure difference is maintained between the main chamber 18 and the contaminant outlet to ensure a suitable operation of the air cleaner. In this regard, although not shown, it may be desirable to house the wick or wicks 24 & 26 in a tubing arrangement which extends below the surface of the liquid in the reservoir 22. Additionally, a tubing arrangement may extend between the contaminant outlet and the reservoir 22. Alternatively, the contaminant outlet may drain into a separate reservoir (not shown) which in turn feeds into reservoir 22 for re-use of the liquid by the nebuliser 20.

The hollow core of the sleeve 32 defines an air outlet 37 in the direction of arrow 36. This outlet 37 is in registration with an air exhaust 38 through which the scrubbed air is expelled into the environment surrounding the cleaner. Between the air outlet 37 and air exhaust 38 is a filter element 40.

Electrical power is provided to the air cleaner via electrical power cable 16 which, at it's end remote from the air cleaner, has an electrical plug formation to engage with a mains electrical socket. Although not shown, the electrical power may be provided by one or more batteries located within the air cleaner or as a part of the refill 23.

The mode of operation for the air cleaner illustrated in FIG. 2. will now be described.

The fan 12 is operable to draw air through the inlet 10 into the cleaner and push the air through a tortuous path into the main chamber 18. Preferably the tortuous path is configured to cause the airflow to swirl upwardly as it enters the main chamber 18. The nebuliser 20 is energised to emit a mist of liquid upwardly into the main chamber 18. The upwardly swirling airflow combines with the upwardly emitted mist and the scrubbing of the airflow is initiated.

Contaminants in the airflow contact the liquid particles of the mist and may remain bound together. Should the bound liquid particle(s) and contaminant(s) reach a certain mass and/or contact the walls of the main chamber 18 and/or be transported to an area of slow airflow within the chamber 18, they may fall out of the airflow toward the base of the chamber 18. The base of the chamber is suitably shaped to guide liquid collecting thereon into fluid entrance 28 in order to pass into the reservoir 22. Liquid entering the reservoir 22 via the fluid entrance may then be available to be transported to the nebuliser 20 again.

Mist particles and bound mist and contaminants particles that have not fallen out of the airflow may be drawn into the inner chamber 30 through the air inlet port 31. The air inlet port 31 directs the airflow at a suitable tangent to initiate a cyclonic flow of air following, at least partially, the boundary defined by the inner wall of the inner chamber 18 and the sleeve denies the airflow a convenient route directly toward the air exhaust 38. The resulting cyclonic airflow may speed up the airflow to permit an increase in the likelihood of a contaminant in the airflow coming into contact with a liquid mist particle. Further, this resulting cyclonic airflow may be capable of acting as an inertial mass separator (IMS).

To allow the airflow to become cyclonic to create the IMS, the airflow must be over a threshold speed which is dependant on the system, the system comprises the internal configuration of the chamber 18, the inner chamber 30, the sleeve 32, the air inlet port 31 amongst other factors. The maximum airflow will also depend on the system but only to the extent that the system can support the airflow without tending to failure. Therefore, the airflow should preferably be tuned to be greater than the threshold speed for that particular system to create cyclonic airflow but less than the maximum for that particular system to conserve power consumption and prolong the mechanical life of the air cleaner.

The IMS operates by the airflow spinning and/or spiraling through the inner chamber 18 with a sufficient air speed to cause the mist and bound mist and contaminant particles to be thrown out of the spinning/spiraling airflow toward the wall of the inner chamber. As the cone narrows increasingly smaller particles in the airflow are thrown out of the airflow towards the wall of the inner chamber 30. As these particles come into contact with the inner chamber, the cone shape guides the particles downwardly toward the contaminant outlet 34. Contaminant outlet 34 acts as a further fluid entrance into the reservoir 22. Liquid entering the reservoir 22 via this fluid entrance may then be available to be transported to the nebuliser 20 again.

As the cone narrows toward the lower portion thereof, the clean air, or at least cleaner air, turns and exits the cone through the centre of the sleeve 32 and toward the air exhaust 38.

A filter 40 is provided between the air outlet 37 and the air exhaust 38 in order to catch any mist particles and/or bound mist and contaminant particles that have not been thrown out of the cyclonic airflow.

A transparent window (not shown) is located adjacent the wick 24 to allow visual access to the water being fed to the nebuliser 20. This provides a visual indication to the user of the cleanliness of the water. Such a window may also serve as a useful end of life indicator for the quantity of liquid held within the refill 23. In the event that the liquid has become unacceptably dirty through use of the cleaner, the refill may be disengaged from the housing 11 and replaced with a new refill.

A transparent window (not shown) may be located in the main chamber 18 to permit the user with a visual indication of whether the air cleaner is operating. Additionally, it is thought that a large number of users of the air cleaner may consider the mist operation of the mist to be atheistically pleasing and the presence of the window will assist in the appreciation of this aesthetic effect. Indeed, the entire main chamber 18 may be substantially transparent to provide the visual indication of operation and permit the user to appreciate the aesthetic effect.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features. Furthermore, the invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. An air cleaner comprising:

a housing having an air inlet and an air exhaust extending therethrough;

a refill for containing a reservoir of liquid which is releasable from the housing;

a nebuliser within the housing configured, in use, to be in fluid contact with the source of liquid to generate a mist of liquid droplets;

said nebuliser being configured, in use, to eject the mist upwardly;

a chamber within the housing in which the mist is substantially retained;

a fan within the housing configured, in use, to generate a flow of air through the air inlet and into the chamber such that at least some of the contaminants present within the air flow are urged by the mist out of the flow of air and toward at least one of the refill or a contaminant outlet.

2. An air cleaner according to claim 1, wherein the air cleaner is for domestic use.

3. An air cleaner according to claim 1, wherein the nebuliser is a piezo-electric nebuliser.

4. An air cleaner according to claim 1, wherein an inner chamber is provided within the chamber.

5. An air cleaner according to claim 4, wherein the inner chamber has an air inlet port at an upper part thereof and an annularly configured sleeve extending at least partially into the interior space within the inner chamber and in registration with the air inlet port.

6. An air cleaner according to claim 1, wherein the inner chamber is at least partially conical wherein the cone narrows toward a lower part thereof.

7. An air cleaner according to claim 6, wherein the lower part of the cone is open to define a contaminant outlet, and wherein the contaminant outlet is in registration with a fluid inlet for the reservoir of the refill.

8. An air cleaner according to claim 4, wherein the sleeve defines an air outlet therethrough in the upper part of the inner chamber, and wherein this outlet is in registration with the air exhaust.

9. An air cleaner according to claim 4, wherein the air inlet port and the sleeve direct the airflow at a suitable tangent to initiate a cyclonic flow of air following, at least partially, the boundary defined by the inner wall of the inner chamber.

10. An air cleaner according to claim 9, wherein the airflow is tuned to be greater than a threshold speed for the air cleaner to create cyclonic airflow but less than the maximum for said air cleaner.

11. An air cleaner according to claim 4, wherein the inner chamber is made from at least two parts.

12. An air cleaner according to claim 11, wherein the separate parts of the inner chamber are connected to each other with a suitable dampening material being present therebetween.

13. An air cleaner according to claim 1, wherein a filter element is located between the air outlet and the air exhaust.

14. An air cleaner according to claim 1, wherein the cleaner is provided with a transparent window allowing visual access to the water being fed to the nebulizer.

15. An air cleaner according to claim 1, wherein the air cleaner is provided with user-selectable controls.

16. An air cleaner according to any claim 1, wherein the air cleaner is provided with a user-selectable boost function.

17. An air cleaner according to claim 1, wherein at least two fans are provided.

18. A method for scrubbing the air in a personal and/or domestic space comprising the steps of:

providing an air cleaner according to claim 1 to the air in the personal or domestic space, and, operating the air cleaner until the air is scrubbed of at least some of the contaminants contained therein.

* * * * *